Feb. 22, 1949.   M. BEYMER   2,462,458
SPOT WELDING APPARATUS
Filed July 14, 1948   2 Sheets-Sheet 2
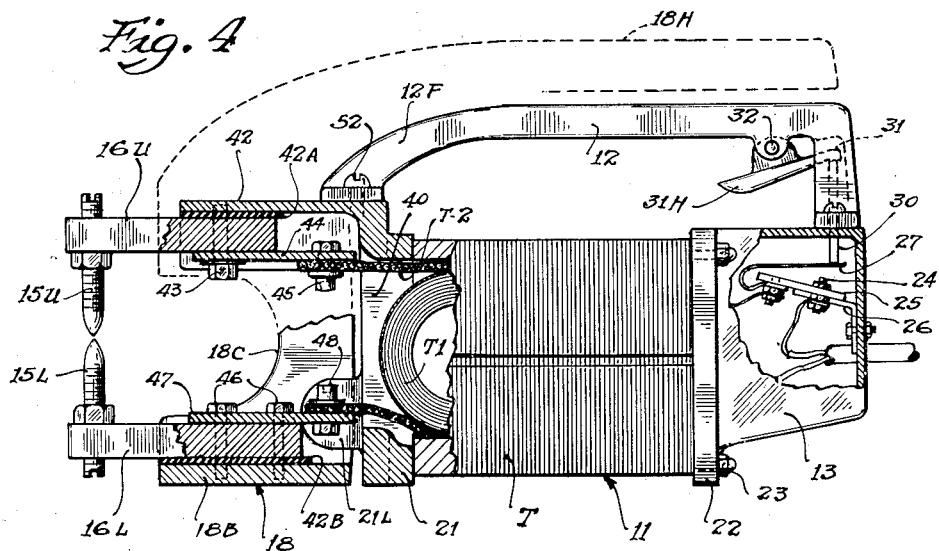
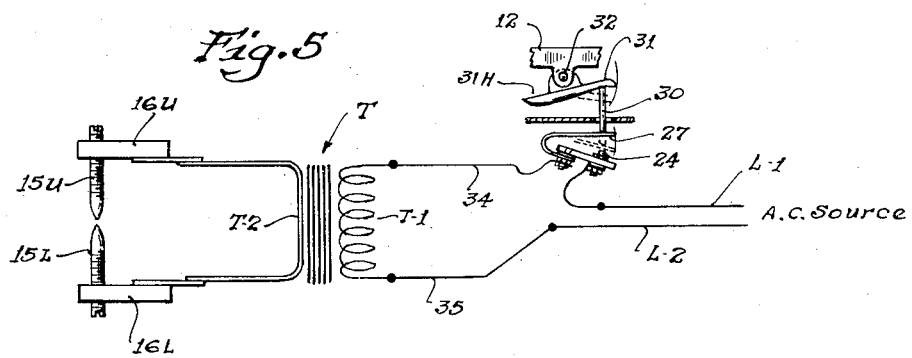
Inventor
Marshall Beymer
By Ferd Bing
Attorney Patented Feb. 22, 1949

2,462,458

UNITED STATES PATENT OFFICE 2,462,458

SPOT WELDING APPARATUS

Marshall Beymer, Chicago, Ill., assignor of one-half to Henry L. Sweitz, Chicago, Ill.

Application July 14, 1948, Serial No. 38,620

4 Claims. (Cl. 219—4)

This invention relates to spot welding apparatus, and particularly to such apparatus that is small and portable in character.

In spot welding apparatus as heretofore utilized, it has been customary to afford opposed electrodes arranged in a substantially vertical relationship so that the work might be placed in position between such electrodes. It has been customary to assemble the parts to be welded on top of the lower invisible electrode in a fixed or stationary position using both of the worker's hands and to move the upper electrode down into position in abutment with the upper surface of the work by some other means, after which the necessary welding current has been applied to the work through the opposed and clamping electrodes. While the need for a practical portable spot welding apparatus has long existed, such portable apparatus offered has not been sufficiently practical to be acceptable in the trade, and it is, therefore, an important object of the present invention to afford a portable spot welding apparatus that is not only completely simple in character, but which is mechanically capable of convenient and effective use using but one hand. More particularly, it is an object of the present invention to enable portable spot welding apparatus to be readily, visibly and easily applied to the point of work, using but one of the operator's hands, and an object related to the foregoing is to enable a substantial portion of the weight of a portable spot welding apparatus to be supported by the work and to visibly facilitate the location and clamping of the electrodes on the work as well as the application of the welding current to the work, thereby freeing the operator's other hand for use in holding or otherwise manipulating the parts to be welded.

Another and more specific object of the present invention is to afford a spot welding device that is readily portable in character and which may be supported by one hand in such a way that the electrodes may be visibly placed on and clamped to the work at the point to be welded and the control switch operated by this same hand in a convenient and practical manner, freeing the second hand for purposes concerning the work. Related objects are to utilize the top electrode as a supporting arm for such a portable spot welding apparatus in such a way that the weight of the spot welding apparatus may be readily supported and the electrode clamping and switch operating means readily operated while the worker is supporting a lesser portion of the weight of the apparatus. More specifically, it is an object of the present invention to enable the upper electrode of a spot welding apparatus to be arranged in a fixed relation with respect to the body of the spot welding apparatus, thereby to enable this electrode to act in part as a means to support in part the weight of the welding apparatus, and the related object is to enable the lower electrode to be conveniently moved by the selfsame supporting hand to its clamping and fusing relation while the upper electrode is in position on top of the work.

Other and further objects of the present invention will be apparent from the following description and claims and are illustrated in the accompanying drawings which, by way of illustration, show a preferred embodiment and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claims.

In the drawings:

Fig. 4 is a view taken partially in longitudinal vertical cross section and showing features of internal construction; and Fig. 5 is a schematic wiring diagram illustrating the electrical features of the apparatus.

Figure 1:
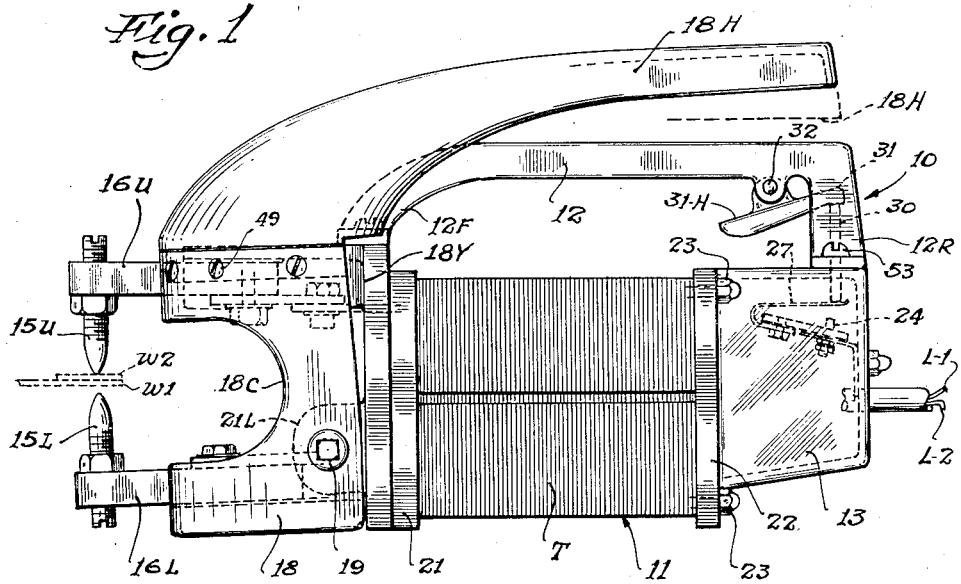
Fig. 1 is a side elevational view of a spot welder embodying the features of the invention.

For purposes of disclosure, the invention is herein illustrated as embodied in a portable spot welder 10 having a main body 11 with a lower stationary handle 12 extended along the upper side thereof. The body 11 has a switch enclosing housing 13 at its rear or right hand end as viewed in Fig. 1, while at the forward end, an upper electrode 15U is supported on a stationary horizontal arm 16U in opposed relation to a lower electrode 15L that is supported on a relatively movable arm 16L. The lower arm 16L is carried on a rocking frame 18 that is pivoted at 19 on the forward end portion of the body 11 near the lower edge thereof as will hereinafter be described in detail, and this operating rocker 18 has a handle portion 18H that extends rearwardly over the handle 12 so that it may be moved downwardly to the dotted line position shown in Fig. 1 to effect upward clamping movement of the lower electrode 15L.

The body 11 is made up in a large measure by a step-down transformer T in which the laminations are arranged in transverse vertical planes so as to be clamped between a front plate 21 and a rear plate 22 by means of longitudinal tie rods 23. The rear plate 22 is formed as a flange on the switch enclosing housing 13, and thus tie rods 23 serve to hold the switch housing 13 in position. Within the housing 13, a stationary switch contact 24 is mounted on an insulating plate 25 which is in turn supported by a bracket 26. On the insulating plate 25 a movable switch element 27 in the form of a spring is arranged for engagement with the contact 24. This spring contact 27 normally assumes the open position shown in Fig. 4, and an insulating pin 30 that is slidably positioned in the housing 13 extends upwardly near the right hand end of the handle 12 so as to be disposed beneath the rear end of a switch operating lever 31. This switch operating lever 31 is pivoted at 32 on the lower face of the handle 12, and a projecting forward end 31H is so disposed that it may be engaged and moved upwardly by the finger of the user so as to thereby force the pin 30 downwardly and effect closure of the switch 27—24. The contact 24 is connected as shown in Fig. 5 to one line wire L—1 of an alternating current source, while the other contact 27 is connected by a wire 34 to one terminal of the primary winding T—1 of the transformer T. The other terminal of the primary winding is connected by wire 35 to the other line wire L—2 of the alternating current source. The secondary T—2 of the transformer T is afforded by a single loop of a relatively heavy conductor that may be in the form of a flat woven wire, strand or ribbon, and the ends of this strand or ribbon are extended through the plate 21 and are connected to the two electrodes 15U and 15L as will hereinafter be described.

Figure 2:
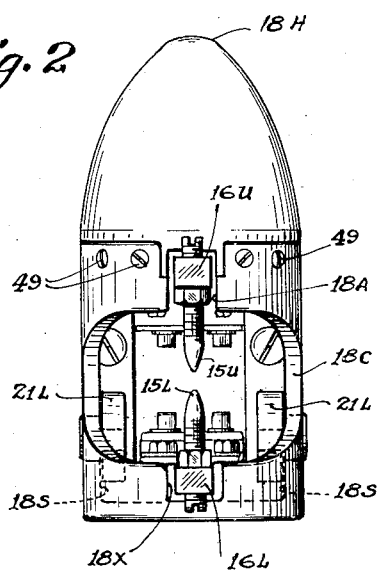
Fig. 2 is a view of the left hand or forward end of the welder.

The forward plate 21 of the body 11 is formed with a relatively large opening 40 therethrough so that the wires or strands that form the secondary T—2 of the transformer may be extended forwardly through this opening for appropriate connection with the upper and lower electrodes. The front plate 21 also is provided with a forwardly projecting and rigidly related mounting arm 42, as will be evident in Fig. 4 of the drawings, and this rigid arm 42 serves as a mounting for the upper supporting arm 16U. Thus the arm 16U has the rear portion thereof located beneath the arm 42 with a sheet of insulating material 42A therebetween, and a cap screw 43 serves to secure these arms 16U and 42 rigidly together. The cap screw 43 also serves to secure a conductor plate 44 against the lower face of the arm 16U, and this conductor plate 44 extends rearwardly and is connected by means of a screw and nut device 45 to one end of the strand that forms the secondary T—2 of the transformer. Thus the arm 16U is supported rigidly and in a forwardly projecting relation with respect to the body 11 of the apparatus, and the arm 16L is movably supported on the rocker 18 in a manner that is quite similar to the mounting of the upper arm 16U. Thus the rocker 18, as shown in Figs. 1, 2 and 4, includes a bottom wall 18B, and the arm 16L extends rearwardly into position over the upper surface of the wall 18B, and a sheet of insulating material 42B is disposed therebetween. Cap screws 46 serve to secure the arm 16L in place on the wall 18B, and these cap screws also serve to secure a conducting plate 47 to the upper face of the arm 16L. A screw and nut device 48 secures the other end of the transformer secondary T—2 to the rear end of the plate 47.

As will be evident in Figs. 1, 2 and 4, the rocker 18 has spaced side walls 18S that extend upwardly from the bottom wall 18B, and these side walls curve inwardly at their forward edges so as to make the forward edge portion of the rocker 18 relatively narrow. These side walls 18S are disposed just outwardly of rigid lugs 21L that are formed on the forward side of the plate 21 near the lower corners thereof, and pivot pins 19 extend through the respective side walls 18S and into the adjacent lugs 21L to afford the pivotal support for the rocker 18. At the upper edges of the side walls 18S, the handle portion 18H is connected to such side walls by cap screws 49, but it will be apparent, of course, that this handle might be made integral with the side walls 18S in many instances. The handle 18H is of such a shape as to conform with the upper outline of the walls 18S at the points of connection therewith, and it should be observed that the handle 18H is relatively hollow, as will be evident in Figs. 1 and 3. The handle 18H thus tapers rearwardly to a smaller cross sectional form and is relatively narrow in those portions where the handle 18H overlies the handle 12.

Figure 3:
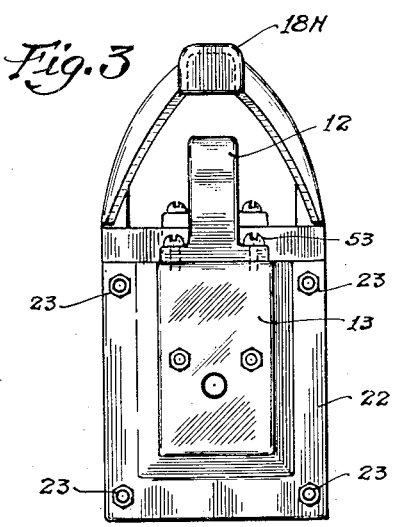
Fig. 3 is a view of the right hand or rear end of the welder.

The side walls 18S are cut away at their forward edges as at 18C in Figs. 1, 2 and 3 to afford a relatively deep, forwardly opening throat rearwardly of the electrodes, thereby enabling spot welds to be formed a substantial distance from the edge of a work piece. Moreover, at their forward ends, and centrally thereof, the side walls 18S are cut away as at 18A and 18X, Fig. 2, thereby to afford clearance for the projecting arms 16U and 16L, respectively. The upper rear edges of the side walls 18S are relieved as at 18Y, Fig. 1, so as to afford clearance and allow the rocker 18 to move through the desired electrode clamping movement.

The handle 12 is afforded by a relatively long horizontal portion that forms the grasping portion, and at its forward end the handle extends down at 12F and is secured to the upper edge portion of the plate 21 by cap screws 52, while at the rear end the handle 12 has a downwardly extending portion 12R that is secured by cap screws 53 to the upper wall of the housing 13.

With the structure that is thus afforded, the apparatus may be conveniently utilized to weld sheets such as W—1 and W—2, Fig. 1, together. In such use the tool is put into position with the rigid or stationary upper electrode 15U resting on the upper surface of the work, and through this arrangement a substantial portion of the weight of the tool is supported. The worker, of course, supports the balance of the weight of the tool by means of the handle 12, and after the upper electrode 15U has been accurately located, the lower electrode 15L may readily be raised into the desired clamping relationship merely by gripping the handle 18H so as to press the same downwardly, toward the handle 12. After this is done the operator may engage the handle 31H with one finger so as to close the switch 24—27, and the welding current is thus applied to the work through the electrodes 15U and 15L. With the apparatus that is thus provided by the present invention, the workmen may readily locate the spot welds accurately in the desired position, and this may be accomplished in a simple manner and without excessive effort.

Thus, while I have illustrated and described the preferred embodiment of my invention, it is to be understood that this is capable of variation and modification and I therefore do not wish to be limited to the precise details set forth, but desire to avail myself of such changes and alterations as fall within the purview of the following claims.

I claim:

1. In a portable spot welding apparatus, an elongated body including a transformer, a lifting handle extending along the top of said body for lifting the same, an upper electrode extended in a fixed relation from one end of said body, a lower electrode movably mounted on said body below and in operative alignment with said upper electrode, energizing connections from said transformer to said electrodes, and an electrode clamping handle movably mounted on said body and disposed above said lifting handle, said lower electrode being mounted on said clamping handle for movement thereby.

2. In a portable spot welding apparatus, an elongated body including a transformer, a lifting handle extending longitudinally along the top of said body for lifting the same, an upper electrode extended in a fixed relation from an upper end portion of one end of said body, a lower electrode disposed below and in operative alignment with said upper electrode, energizing connections from said transformer to said electrodes, and an electrode clamping handle mounted on said body and disposed above said lifting handle, and a rocker pivoted on said body at said one end of said body and on which said lower electrode is fixed, said rocker being operatively connected to said clamping handle for clamping said lower electrode upon predetermined relative movement of said handles.

3. In a portable spot welding apparatus, an elongated body including a transformer and clamping plates at opposite ends of the transformer, a switch housing on the clamping plate at one end of the transformer, a rigid electrode support extended from the upper portion of the plate at the other end, a lifting handle extending along the top of said body for lifting the same, and fixed respectively to said switch box and said electrode support, an upper electrode fixed to said electrode support, a rocker pivoted on a transverse horizontal axis near the lower portion of said plate at said other end, a lower electrode fixed on said rocker below and in operative alignment with said upper electrode, energizing connections from said transformer to said electrodes, and an electrode-clamping handle fixed to said rocker and disposed above said lifting handle for clamping said lower electrode upon predetermined relative movement of said handles.

4. In a portable spot welding apparatus, an elongated body including a transformer, and clamping plates at opposite ends of the transformer, pivot lugs formed on the clamping plate at one end of the transformer near the lower edge thereof and a rigid electrode support extended from the upper portion of said last mentioned plate, a lifting handle extending along and connected to the top of said body for lifting the same, an upper electrode fixed to said electrode support, a rocker pivoted on a transverse horizontal axis on said lugs near the lower portion of said body at said one end, a lower electrode fixed on said rocker below and in operative alignment with said upper electrode, energizing connections from said transformer to said electrodes, and an electrode clamping handle fixed to said rocker and disposed above and in closely spaced and generally parallel relation with respect to said lifting handle for clamping said lower electrode upon predetermined relative movement of said handles.

MARSHALL BEYMER.

REFERENCES CITED

The following references are of record in the file of this patent:

UNITED STATES PATENTS

| Number | Name | Date |
| --- | --- | --- |
| 1,779,365 | Von Henke | Oct. 21, 1930 |
| 2,115,084 | Podany | Apr. 26, 1938 |
| 2,267,297 | Campbell | Dec. 23, 1941 |
| 2,441,438 | Mulder | May 11, 1948 |